United States Patent
Park et al.

(10) Patent No.: US 6,801,832 B2
(45) Date of Patent: Oct. 5, 2004

(54) METHOD FOR GIVING NAVIGATION INFORMATION TO NAVIGATION TERMINAL USER

(75) Inventors: Sang-Ho Park, Anyang (KR); Yong-Ik Choi, Suwon (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 10/284,853

(22) Filed: Oct. 31, 2002

(65) Prior Publication Data

US 2003/0088359 A1 May 8, 2003

(30) Foreign Application Priority Data

Nov. 2, 2001 (KR) ................................. 10-2001-0068315

(51) Int. Cl.[7] .............................................. G01C 21/00
(52) U.S. Cl. ...................... 700/200; 701/24; 701/211; 342/357.1
(58) Field of Search ................................. 701/200, 211, 701/214, 24; 342/350, 357.01, 357.09

(56) References Cited

U.S. PATENT DOCUMENTS

2002/0022489 A1 * 2/2002 Odashima et al. .......... 455/456

* cited by examiner

*Primary Examiner*—Yonel Beaulieu
(74) *Attorney, Agent, or Firm*—Dilworth & Barrese, LLP

(57) ABSTRACT

A method for providing navigation information to a navigation terminal user, which allows an ITS terminal to receive navigation information from an information center via a mobile communication terminal, and audibly guides the navigation information to a user. The method for a navigation terminal using a wireless network to receive navigation information related to a predetermined position from an information center includes transmitting position information to the information center via a voice channel, and receiving the navigation information related to the predetermined position from the information center via a data channel.

7 Claims, 5 Drawing Sheets

METHOD FOR GIVING NAVIGATION INFORMATION TO NAVIGATION TERMINAL USER

PRIORITY

This application claims priority to an application entitled "METHOD FOR GIVING NAVIGATION INFORMATION TO NAVIGATION TERMINAL USER", filed in the Korean Intellectual Property Office on Nov. 2, 2001 and assigned Serial No. 2001-68315, the contents of which are hereby incorporated by reference.

BACKGROUND OF THE INVENTION

1. Field of the Invention

The present invention relates generally to a navigation system, and more particularly to a method for allowing an ITS (Intelligent Transportation System) terminal to receive navigation information from an information center via a mobile communication terminal, and audibly providing the navigation information.

2. Description of the Related Art

Typically, a vehicle navigation system reads digital map data in the vicinity of a current vehicle position from a CD-ROM (Compact Disc-Read Only Memory), a DVD-ROM (Digital Video Disc-Read Only Memory), or a flash memory, etc., and displays the read digital map data on its own display device, for example, an LCD (Liquid Crystal Display). Also, the vehicle navigation system outputs a turn-by-turn guidance voice directing a vehicle to a destination via an additional speaker, thereby enabling a vehicle driver to travel from a current position to the destination.

FIG. 1 is a block diagram of a conventional navigation system mounted to a vehicle.

Referring to FIG. 1, a GPS (Global Positioning System) receiver 12 receives signals from a plurality of artificial satellites contained in a GPS via an antenna (not shown). A gyro sensor 14 and a velocity sensor 16 form a sensor unit. This sensor unit detects an angle of rotation and a velocity of a vehicle by means of the gyro sensor 14 and the velocity sensor 16, respectively. A map data storage unit 18 stores map data and other supplementary information data therein. The map data storage unit 18 is typically implemented with a CD-ROM. A controller 10 controls an overall operation of a navigation system. For example, the controller 10 calculates a current vehicle pseudo position value on the basis of the rotation angle and velocity of the vehicle received from the sensor unit, and selects one of pseudo coordinates of a current position received from the GPS receiver 12 and the calculated vehicle pseudo position. In this case, a reference for selecting one of the pseudo coordinates and the calculated vehicle pseudo position value adopts the calculated pseudo coordinates in case of a low accumulated error, but adopts the pseudo coordinates received from the GPS receiver 12 in case of a high accumulated error, thereby correcting the accumulated error. The controller 10 calculates not only a current vehicle position, but also traveling information such as vehicle speed and direction. The controller 10 reads map data of a peripheral area from the map data storage unit 18 on the basis of the calculated traveling information, and not only visually displays the map data on a display 26, but also outputs audibly the map data via a speaker 30. Besides the aforementioned basic function, the controller 10 further indicates an optimum path from a current position to a destination. A ROM (Read Only Memory) 20 and a RAM (Random Access Memory) 22 temporarily store a program for operation and data processed in the operation. A graphic processor 24 performs graphic processing that enables a driver to visually recognize the traveling information calculated by the controller 10, and then processes the graphic-processed traveling information as display data. The display 26 displays the display data processed by the graphic processor 24 thereon. Such display 26 may be implemented with a CRT (Cathode Ray Tube) or an LCD. A voice processor 28 performs a voice data processing to allow a driver to audibly recognize the traveling information calculated by the controller 10. A speaker 30 outputs the voice data processed by the voice processor 28. The graphic processor 24 processes the map data read from the map data storage unit 18 as display data, and the voice processor 28 processes any status generated while performing a variety of functions as voice data.

As stated above, a conventional navigation system is mounted to a moving object (e.g., a vehicle) as a supplementary device, and provides a driver with a convenient function such an optimum path guide service. However, such conventional navigation systems have a disadvantage in that it is difficult to indicate a path in consideration of traffic conditions varying in real time, and it is also difficult to dynamically vary map data in accordance with changes in road conditions (e.g., a newly-opened road or a road under construction).

Commonly, a hands-free set is mounted to most of vehicles in which a driver uses a mobile communication terminal such as a HHP (Hand Held Phone). However, if the hands-free set and the navigation equipment are additionally mounted to a vehicle, a loss of usable space as well as an increased cost, resulting in driver inconvenience in using traffic information of a mobile terminal. For example, to obtain traffic-related information, a driver of a vehicle including a navigation system may obtain some information from the navigation equipment, or may obtain other information from a HHP because the driver can receive real-time traffic condition information via the HHP without using the navigation system. Therefore, it is necessary that the mobile communication terminal, the hands-free set, and the navigation equipment being interrelated should be more effectively implemented and used.

Consequently, a new navigation device including a hands-free function has been developed. This navigation device including a hands-free function commonly does not include an additional display, and displays all necessary information on a display screen of a mobile communication terminal. Also, although a high-end navigation device having a detachable display has been developed, it is more expensive than the aforesaid common navigation device. Further, it is necessary for a driver to visually recognize navigation information displayed on a display screen even if a display is contained in the high-end navigation device, thereby lowering a sense of safety of the driver while driving a vehicle.

SUMMARY OF THE INVENTION

Therefore, the present invention has been made in view of the above problems, and it is an object of the present invention to provide a method for allowing an ITS terminal to receive navigation information from an information center via a mobile communication terminal, and audibly provide the navigation information.

In accordance with the present invention, the above and other objects are accomplished by a method for allowing a navigation terminal using a wireless network to receive navigation information related to a predetermined position from an information center, comprising the steps of: a) transmitting position information to the information center via a voice channel; and b) receiving the navigation information related to the predetermined position from the information center via a data channel.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
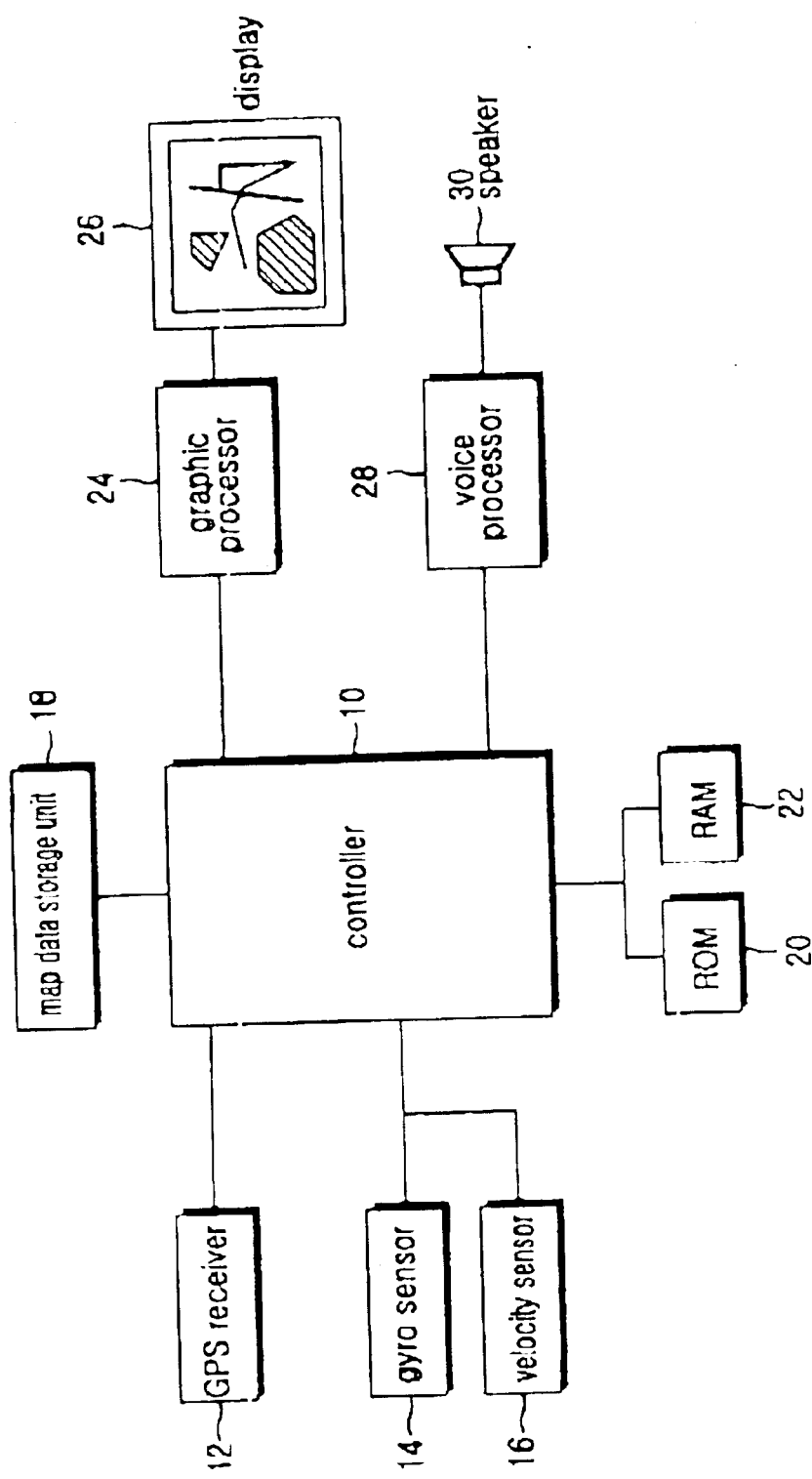
FIG. 1 is a block diagram of a conventional navigation system mounted to a vehicle.

Preferred embodiments of the present invention will be described in detail herein below with reference to the annexed drawings. In the drawings, same or similar elements are denoted by the same reference numerals even though they are depicted in different drawings. In the following description, a detailed description of known functions and configurations incorporated herein will be omitted when it may make the subject matter of the present invention rather unclear. Also, the terms used in the following description are terms defined taking into consideration the functions obtained in accordance with the present invention. The definitions of these terms should be determined based on the whole contents of this specification because they may be changed in accordance with the needs of a user or a usual practice.

Figure 2:
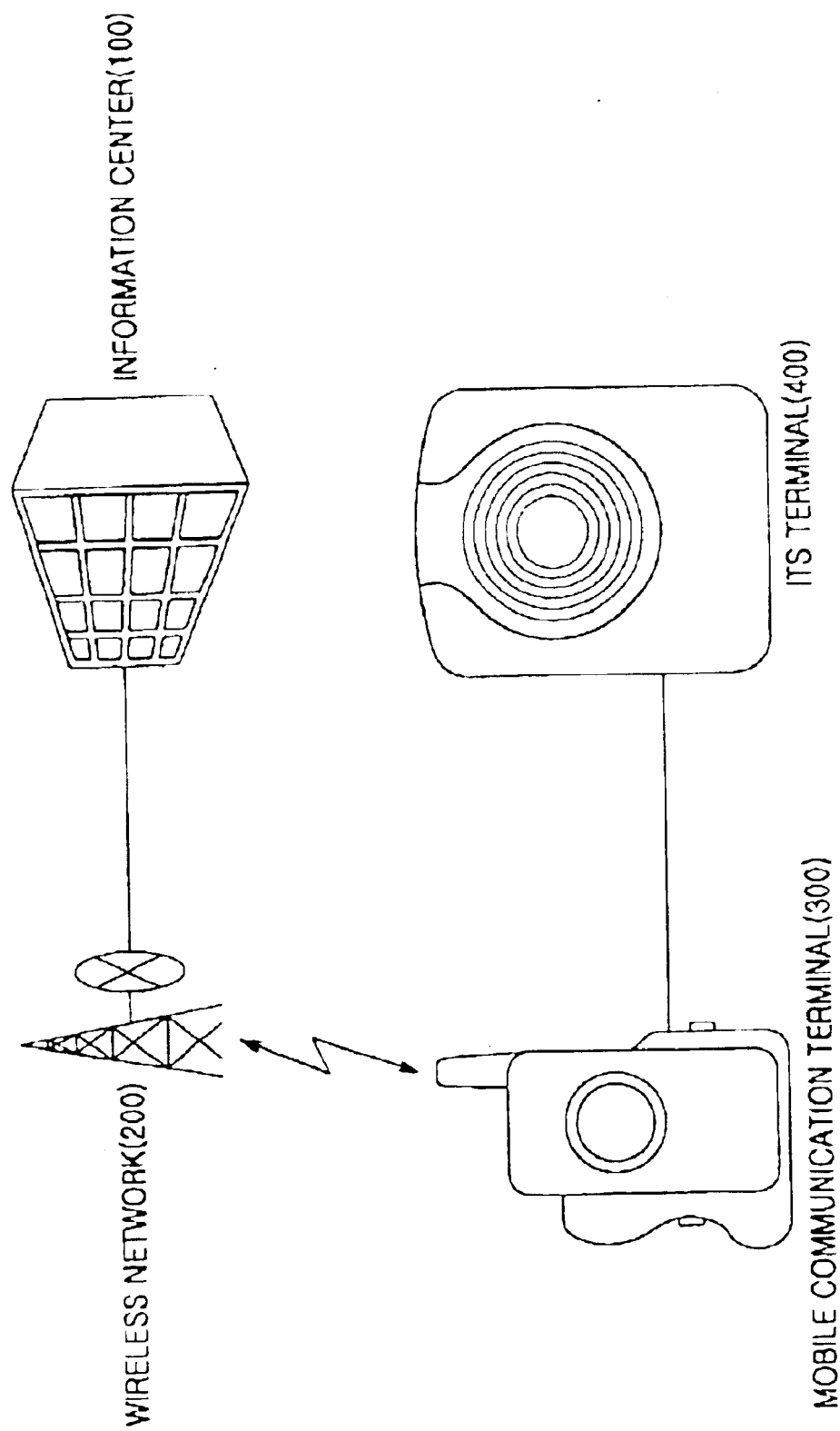
FIG. 2 is a block diagram of a navigation system in accordance with a preferred embodiment of the present invention.

FIG. 2 is a block diagram of a navigation system in accordance with a preferred embodiment of the present invention. Referring to FIG. 2, a navigation system comprises an information center 100, a wireless network 200, a mobile communication terminal 300, and an ITS terminal 400. In a different way from a configuration illustrated in FIG. 2, the mobile communication terminal 300 and the ITS terminal may be integrated as one body, and thus this integrated terminal is hereinafter called "a navigation terminal".

The information center 100 stores map data and real-time traffic information therein. When the mobile communication terminal 300 requests a navigation function, the information center 100 generates corresponding navigation information by referring to the map data and the real-time traffic information, and provides the mobile communication terminal 300 with the corresponding navigation information over the wireless network 200. For example, when the mobile communication terminal 300 requests a navigation system to indicate an optimum path from a current vehicle position to a destination, the information center 100 generates information for indicating the optimum path from the current vehicle position to the destination by referring to the map data and the real-time traffic information.

The wireless network 200 is an information transmission path between the information center 100 and the mobile communication terminal 300. The wireless network 200 may be implemented with a communication system using a PCS (Personal Communication System) or a digital cellular system using IS-95A, IS-95B, or IS-95C. Alternatively, the wireless network 200 may be implemented with a CDMA digital cellular system using either an IMT-2000 (International Mobile Telecommunications 2000) or UMTS (Universal Mobile Telecommunication Systems).

The mobile communication terminal 300 is typically operated in a mode providing a user with a voice communication service, and is also operated in a navigation mode supporting a navigation function according to the present invention. In the navigation mode, the mobile communication terminal 300 gains access to the wireless network 200, receives various navigation information from the information center 100, and provides a user with the received navigation information by interworking with the ITS terminal 400.

In the navigation mode, a user sets a current vehicle position and a destination on the mobile communication terminal 300, and requests the information center 100 to indicate an optimum traveling path. Therefore, the user can receive a guide service for the optimum traveling path between the current vehicle position and the destination from the information center 100, where the guide service is considered as a typical navigation function. In this case, the user may set various information, such as a building name, a regional category, an administrative title, a phone number, or longitude and latitude coordinates, for indicating a destination by manually inputting his/her voice signal or character information into his/her mobile communication terminal. Further, in the navigation mode, the user may receive traffic information (e.g., traveling direction information, local information, national highway information, expressway information, bookmark area information, etc.) from the information center 100. Still further, the user may gain access to the information center 100 via the mobile communication terminal 300, and thus may search peripheral buildings (e.g., an oil station, a resting place, a car maintenance shop, a bank, and a hospital/drugstore, etc.).

The mobile communication terminal 300 visually and/or audibly provides a user with the received guide information in association with the ITS terminal 400. The guide information visually provided may be displayed on a display of the mobile communication terminal 300, or may be displayed on a dedicated display separately connected to an outer part of the mobile communication terminal 300. Also, the guide information audibly provided may be transmitted to the outside via either a speaker of the mobile communication terminal 300 or a speaker of the ITS terminal 400.

Figure 3:
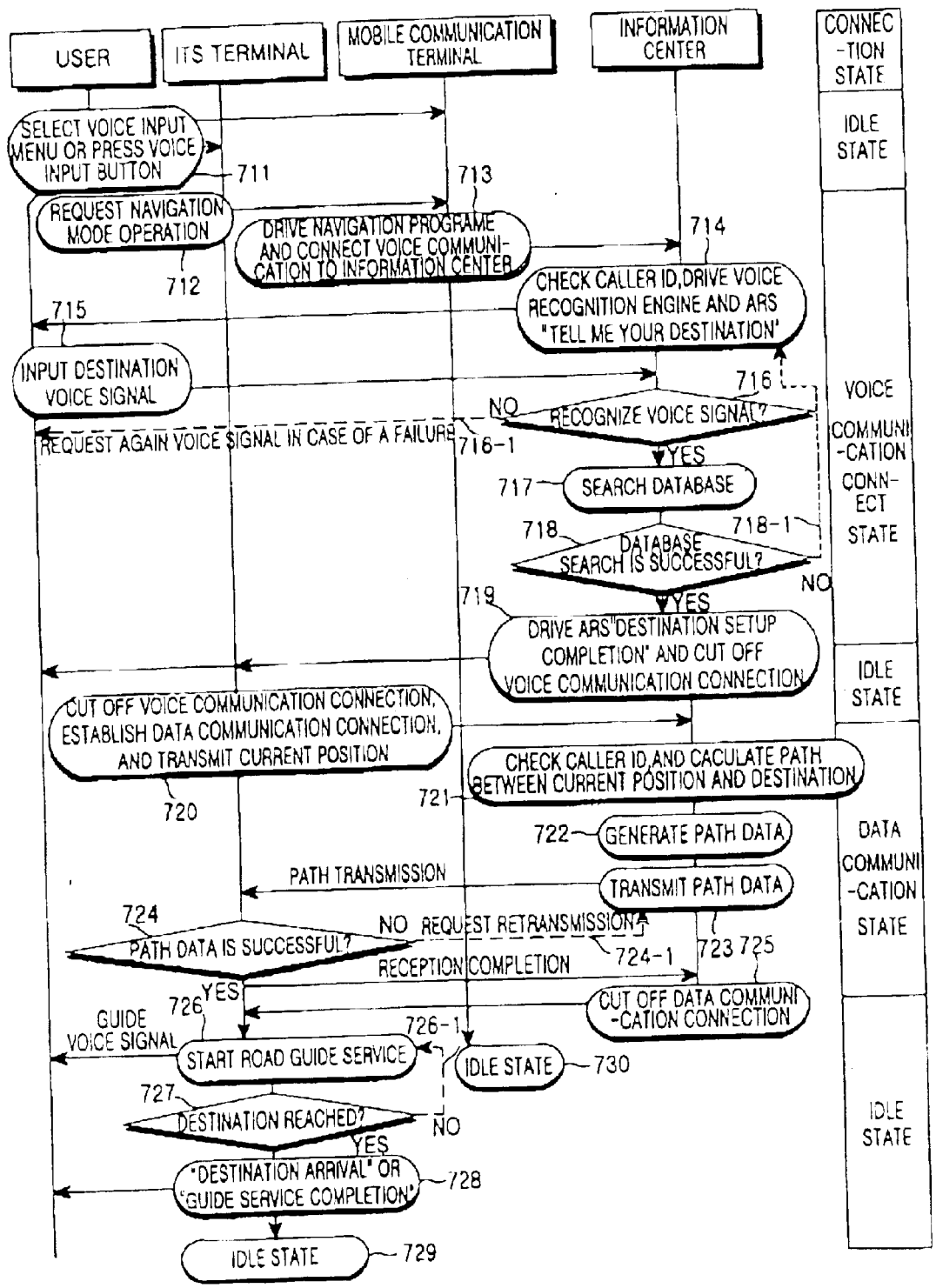
FIG. 3 is a flow chart illustrating a method for allowing an ITS terminal to audibly indicate navigation information received from an information center, employing a mobile communication terminal.

FIG. 3 is a flow chart illustrating a method for an ITS terminal to audibly guide navigation information received from an information center, employing a mobile communication terminal. Referring to FIG. 3, if a voice input button of an ITS terminal 400 is pressed at step 711, then the ITS terminal 400 requests a mobile communication terminal 300 to perform a navigation mode operation at step 712. The mobile communication terminal 300 connects voice communication to an information center 100 by driving a navigation program at step 713. On the other hand, if a user directly selects a voice input menu of the mobile communication terminal 300 at step 711, a program goes to step 713 without passing the aforesaid request step 712.

If the mobile communication terminal 300 attempts to connect in a voice call connection state with the information center 100 at step 713 and succeeds in entering into the voice call connection state with the information center 100, the information center 100 checks a caller ID, and then drives a voice recognition engine and an ARS (Auto Response System) at step 714. In this case, the ARS may generate a predetermined voice signal, for example, a signal "Tell me your destination". Such a voice signal is transmitted to a speaker of the ITS terminal 400 via the mobile communication terminal 300, thereby audibly informing a user of the voice signal.

If a user inputs a desired destination voice signal (e.g., a signal "Samsung-dong") at step 715, then the voice signal is transmitted to the information center 100 via the ITS terminal 400 and the mobile communication terminal 300. If the information center 100 recognizes the voice signal at step 716, then it searches a database at step 717. However, if the information center 100 does not recognize the voice signal at step 716, then it requests again a voice signal from the user at step 716-1. The information center 100 determines at step 718 whether a database search of the step 717 is successfully performed. If the database search is not successfully performed at step 718, a program returns to the above step 714. If the database search is successfully performed at step 718, then the information center 100 generates voice guide information such as a signal "Destination Setup Completion", and cuts off a voice call connection at step 719. Such voice guide information is transmitted to a speaker of the ITS terminal 400 via the mobile communication terminal 300, and thereby the user audibly hears the voice guide information.

Thereafter, the ITS terminal 400 cuts off the voice call connection state, and attempts to establish data communication connection at step 720. Then, current position information is transmitted to the ITS terminal 400.

The ITS terminal 400 checks a caller ID, and calculates a path between a current position and a destination at step 721. Path data is generated at step 722, is transmitted to the ITS terminal 400 at step 723, and then the data communication connection state is cut off at step 725. The path data is transmitted to the ITS terminal 400 via the mobile communication terminal 300. The ITS terminal 400 determines at step 724 whether the path data is successfully received or not. If it is determined at step 724 that the path data is not successfully received, the ITS terminal 400 requests retransmission of the path data at step 724-1, and then returns to the above step 723. Otherwise, if it is determined at step 724 that the path data is successfully received, then the ITS terminal 400 informs the information center 100 of the path data's reception completion.

The ITS terminal 400 starts a road guide service using a voice signal at step 726, and determines at step 727 whether a user reaches a destination or not. If it is determined at step 727 that the user does not reach the destination, this step 727 is repeatedly performed. If it is determined at step 727 that the user reaches the destination, the ITS terminal 400 generates a predetermined guide voice signal such as a signal "Destination Arrival" or "Guide Service Completion" at step 728, and then enters an idle state at step 729.

For the convenience of description and better understanding of the present invention, it should be noted that solid line arrows (←) directly indicating paths from the information center 100 to the ITS terminal 400 are connected via a mobile communication terminal 300.

Although the preferred embodiment illustrated in FIG. 3 describes receiving the path guidance data concerning a specific destination from the information center 100, the scope of the present invention is not limited to this path guidance data concerning the destination, but is capable of extending to traffic information related to a specific position. In other words, position information may be transmitted to the information center 100 via a voice channel in the same manner as the aforementioned, and traffic information related to the position may be received from the information center 100 via a data channel. Besides the traffic information, other information can be applicable to the preferred embodiment of the present invention. This information will hereinafter be called navigation information as a generic term.

Figure 4:
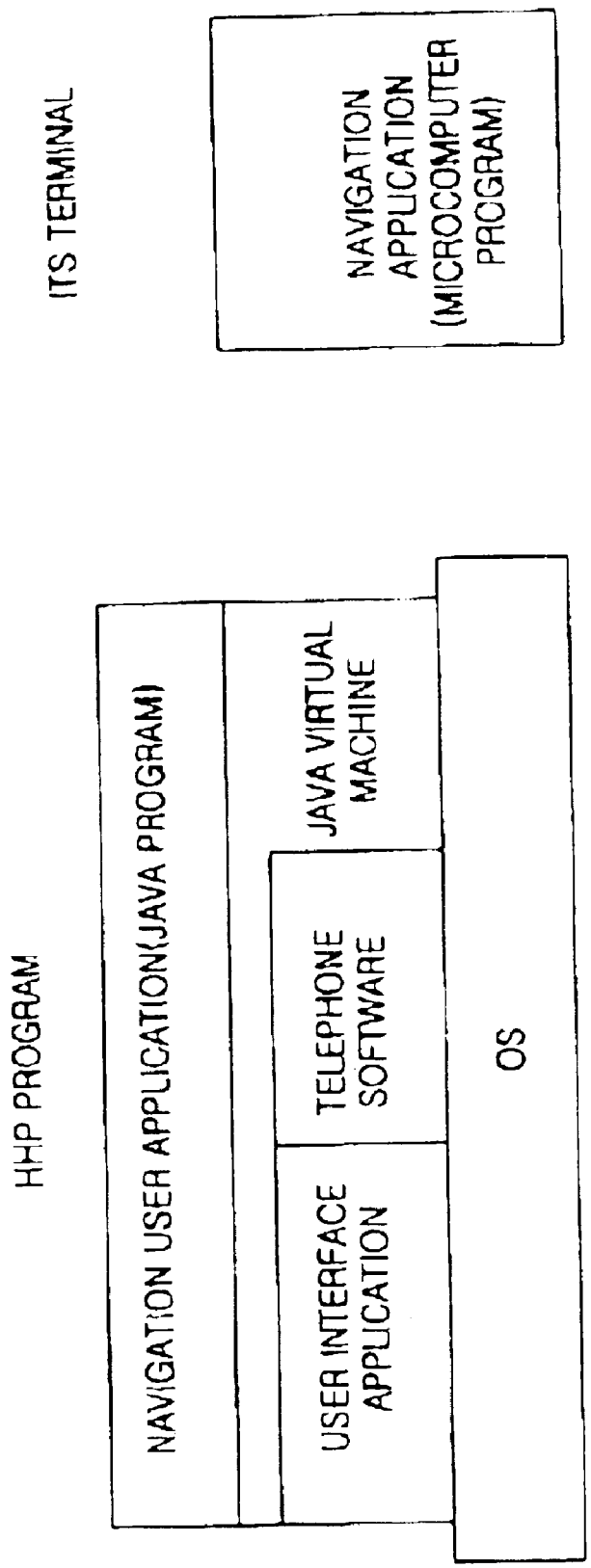
FIG. 4 is a software block diagram of an ITS terminal and a mobile communication terminal in accordance with a preferred embodiment of the present invention.

FIG. 4 is a software block diagram of an ITS terminal and a mobile communication terminal in accordance with a preferred embodiment of the present invention. Referring to FIG. 4, when a navigation application of the ITS terminal is implemented with a microcomputer program and a navigation user interface application of the mobile communication terminal is independently implemented with a Java program, a user can wirelessly download the navigation user interface application when upgrading the navigation application, thereby serving a user's convenience.

Typically, since a mobile communication terminal contains a Java Virtual Machine therein, it easily downloads a navigation program under the condition that there is a specific IP or URL in a data communication mode, and then executes the downloaded navigation program.

As for a destination input procedure, destination information can be audibly input to a navigation system using the ITS terminal, or can be audibly and visually input to a navigation system using the mobile communication terminal. This visually-input destination information may be input to the navigation system using various kinds of option menus provided on the mobile communication terminal.

Vehicle current position information is recognized using a GPS, an acceleration sensor, a gyro sensor, etc. contained in the ITS terminal. Therefore, if the vehicle current position information along with destination information is informed to the information center, the information center calculates an optimum path from a current position to a destination by adopting real-time traffic information, and then downloads the calculated optimum path information to the mobile communication terminal.

Figure 5:
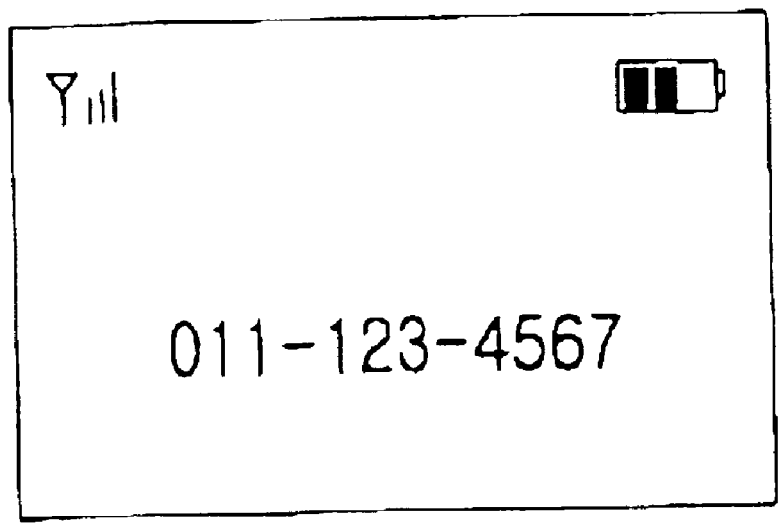
FIG. 5 illustrates information displayed on a display part of a mobile communication terminal in accordance with a preferred embodiment of the present invention.
Figure 6:
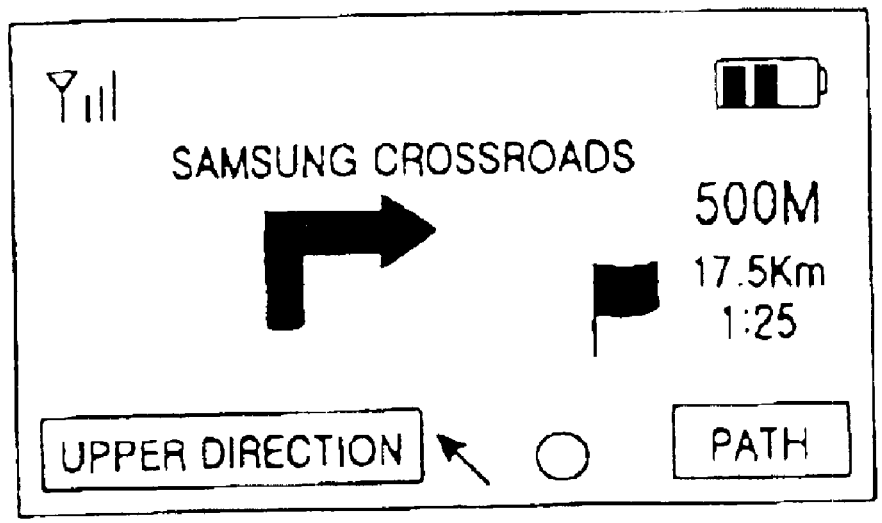
FIG. 6 illustrates another information displayed on a display part of a mobile communication terminal in accordance with a preferred embodiment of the present invention.

FIG. 5 illustrates information displayed on a display of a mobile communication terminal in accordance with a preferred embodiment of the present invention. FIG. 6 illustrates other information displayed on a display of a mobile communication terminal in accordance with a preferred embodiment of the present invention.

While performing a voice guide service using a speaker of an ITS terminal, guidance information for road guidance is displayed on a display screen of a mobile communication terminal as illustrated in FIG. 6. The voice guide service is automatically performed at regular distances, and a user can make a phone call during the voice guide service. In this case, the user can input a desired phone number by pressing a number key provided on a keypad of a mobile communication terminal. Likewise, if the user inputs a desired phone number, the input phone number instead of the path guidance information is displayed on a display screen of a mobile communication terminal, as illustrated in FIG. 5.

Upon completing the phone number input operation, if a communication path is normally formed under the condition that the user presses a communication key button SEND provided on a terminal, voice communication starts. Since a voice guide service signal is mixed with voice communication volume via a speaker of the ITS terminal during the voice communication, the user can receive a path guidance service simultaneously with performing voice communication.

If the voice communication is completed, a current display screen state of the mobile communication terminal automatically returns to a path guidance screen state as illustrated in FIG. 6. Also, when the user receives a call connection signal from a counterpart party during the path guidance service, a display screen state of the mobile communication terminal automatically changes from the path guidance screen state illustrated in FIG. 6, and is converted to a display screen state for informing a user of a call connection request of the counterpart party. Herein, a bell sound of a mobile communication terminal is transmitted to the user via a speaker of the ITS terminal. Then, when the user hear the bell sound and presses a communication key button provided on a keypad of a mobile communication terminal, the user answers the counterpart party's call, thereby forming a call connection state with the counterpart party. In the same manner as the above case, when the user makes a phone call, if the call connection state is completed, then a current display screen state returns to a path guidance screen state. Provided that the mobile communication terminal is a HHP (Hand Held Phone), a terminal's folder or flip should be open during a path guidance service. If the terminal's folder or flip is closed, then the path guidance service is terminated.

As is apparent from the above description, in accordance with the present invention, an ITS terminal receives navigation information from an information center via a mobile communication terminal, and audibly provides the received navigation information to a user in such a way that the user while driving needs not visually check a display screen of a mobile communication terminal, thereby improving safety while driving a vehicle. The ITS terminal receives a user's voice signal indicating a destination at a voice communication mode, whereas it downloads an optimum path from a current position to the destination from an information center at a data communication mode. In this case, since mode conversion between the voice communication mode and the data communication mode is automatically performed, it is necessary for a user to set only a desired destination, thereby providing the user with convenience in using the path guidance service.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for an ITS (Intelligent Transportation System) terminal to receive navigation information from an information center via a mobile communication terminal, and to provide the navigation information to a user, comprising the steps of:
    a) requesting the mobile communication terminal to call the information center, and connecting a voice channel with the information center;
    b) receiving a user's voice signal indicating a destination, and transmitting the user's voice signal to the information center via the voice channel;
    c) after transmitting the user's voice signal to the information center, requesting the mobile communication terminal to cut off connection of the voice channel, and requesting the mobile communication terminal to connect a data channel with the information center; and
    d) receiving navigation information related to the user's voice signal from the information center via the data channel.

2. The method as set forth in claim 1, further comprising the step of:
    transmitting current position information to the information center via the data channel, prior to receiving the navigation information.

3. A method for an ITS (Intelligent Transportation System) terminal to receive navigation information from an information center via a mobile communication terminal, and to provide the navigation information to a user, comprising the steps of:
    a) connecting the mobile communication terminal in a voice communication with the information center;
    b) checking caller information in the information center, and transmitting a voice message requesting destination information transmission;
    c) outputting the voice message received via the mobile communication terminal to a speaker from the ITS terminal, and enabling a user to audibly recognize the voice message;
    d) if the user inputs a voice signal indicating a destination, transmitting the voice signal to the mobile communication terminal from the ITS terminal, and transmitting the voice signal to the information center via the mobile communication terminal;
    e) recognizing the voice signal indicating the destination in the information center, searching a database in the information center, transmitting a voice message indicating recognition completion of the voice signal to the mobile communication terminal, and then cutting off the voice communication connection;
    f) if the mobile communication terminal receives the voice message indicating recognition completion of the voice signal, attempting to perform a data communication connection, and transmitting current position information to the ITS terminal;
    g) if the ITS terminal receives the current position information, calculating in the information center a path from a current position to a destination in order to form path data, and cutting off the data communication connection; and
    h) receiving the path data via the mobile communication terminal in the ITS terminal, and audibly generating the path data.

4. The method as set forth in claim 3, wherein the step (a) includes the step of:
    if a user presses a voice input button of the ITS terminal, requesting in the ITS terminal a navigation mode operation from the mobile communication terminal.

5. The method as set forth in claim 3, wherein the step (a) is performed when a user selects a voice input menu of the mobile communication terminal.

6. A method for a navigation terminal using a wireless network to receive navigation information related to a predetermined position from an information center, comprising the steps of:
    a) transmitting position information to the information center via a voice channel; and b) receiving the navigation information related to the predetermined position from the information center via a data channel.

7. A method for a navigation terminal using a wireless network to receive navigation information related to a predetermined position from an information center, comprising the steps of:

a) connecting a voice channel with the information center;

b) if the information center requests position information, receiving a request signal of the information center, and generating the request signal to allow a user to recognize it;

c) if the user audibly inputs the position information, transmitting the audibly-input position information to the information center; and d) after the information center recognizes the position information, cutting off the voice channel connection, establishing a data channel connection to transmit navigation information related to the position information via the data channel, and cutting off the data channel connection upon receiving the navigation information.

* * * * *